Sept. 11, 1928.
J. ANDRONOWICZ
POTTERY FORMING DIE
Filed Feb. 16, 1926
1,683,855
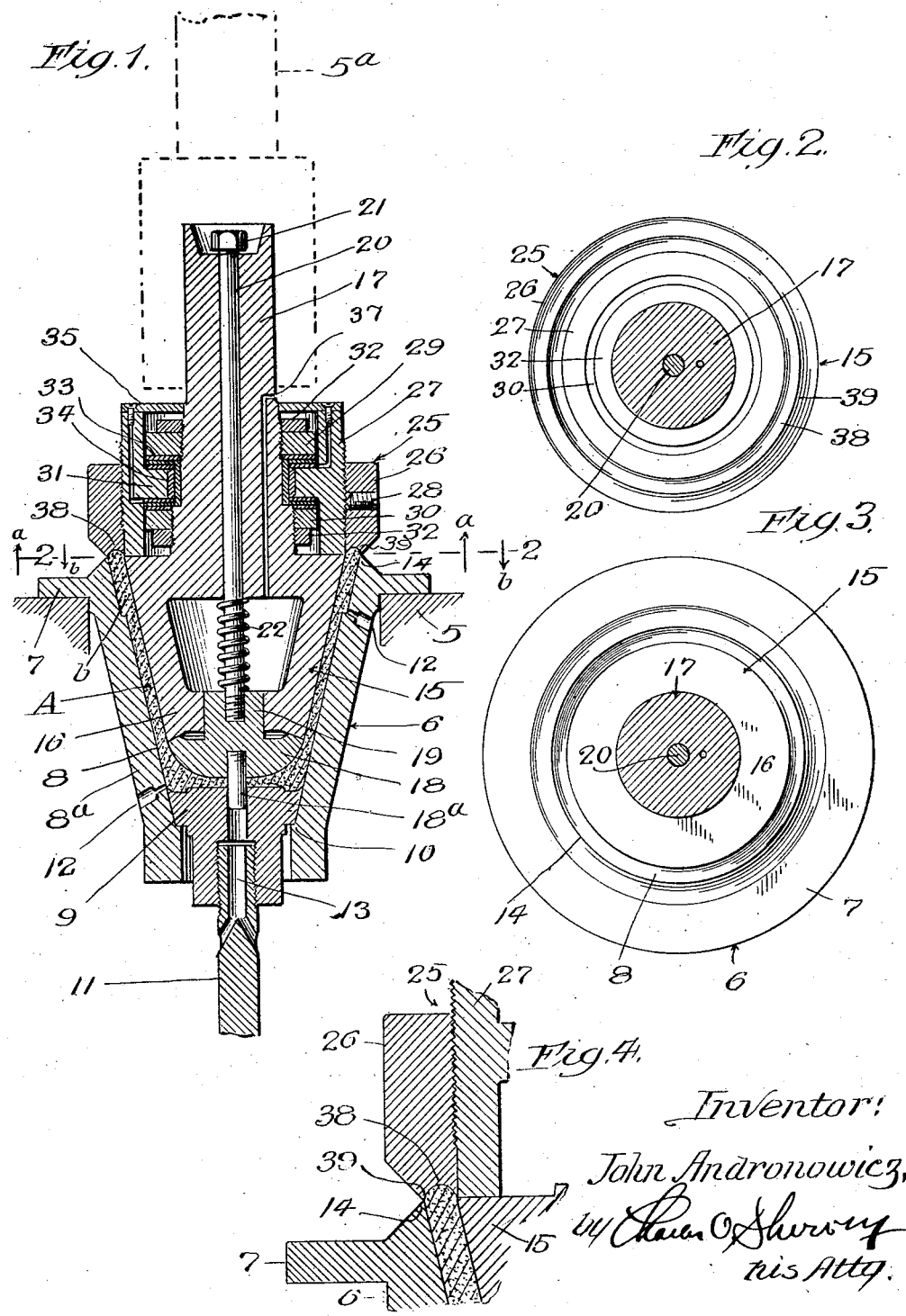

Patented Sept. 11, 1928.

1,683,855

UNITED STATES PATENT OFFICE.

JOHN ANDRONOWICZ, OF CHICAGO, ILLINOIS, ASSIGNOR OF ONE-HALF TO BRUNO BIKIN, OF CHICAGO, ILLINOIS.

POTTERY-FORMING DIE.

Application filed February 16, 1926. Serial No. 88,552.

This invention relates to pottery forming dies, and its principal object is to increase the efficiency of dies of this class and to reduce, to a minimum, the wear on the edge trimming members thereof.

In the ordinary dies for forming pottery ware, such as, flower pots, vases, or other open top, baked clay vessels, a female die or mold is employed, into which a lump of clay is placed, and a male die is used for forcing the clay against the inner side wall of the mold and giving it its proper shape. The male die usually is rotated upon its axis and an edge trimming or cutting member, rigid with the male die, is provided for trimming off the fin or bur that usually forms between the meeting edges of the two dies. The principal objection to such edge trimming or cutting member is that its cutting edge, in coming into contact with the lower die and rotating while in contact therewith, wears away and soon becomes dull and it does not trim off the fin or bur which is squeezed out between the mold and edge trimming member, and that trimming operation must, therefore, be done by the attendant after the dies have done their work, with the result that much unnecessary time is lost, additional work is imposed on the attendant, and finally the edge trimming member must be reground and refitted in order that it may function in any manner at all.

According to the present invention I provide an edge trimming member, which, when brought into contact with the clay, practically stops rotating and wholly ceases to rotate when brought into contact with the female die or mold, whereby the usual abrasive action between the rotating edge trimming and female die is entirely eliminated.

The invention consists, therefore, in a pottery forming die having an edge trimming member, which does not revolve during the final edge trimming act. It further consists in an edge trimming member rotatively mounted on the revoluble male pottery forming die, and capable of coming to a non-rotative state at the end of the down stroke of the male die in forming the article. It further consists in the several novel features of construction arrangement and combination of parts hereinafter fully set forth and claimed.

The invention is clearly illustrated in the accompanying drawing, in which:

Fig. 1, is a central, vertical section of a set of pottery forming dies, embodying a simple form of the present invention; Fig. 2 is a horizontal, cross section taken on the line 2—2 of Fig. 1 and looking in the direction of the arrow $a$, Fig. 3 is a horizontal, cross section taken on the same line 2—2 but looking in the direction of the arrow $b$, and Fig. 4 is a detail fragmental section through the edge trimming member and upper edge portion of the female die.

Referring to said drawing, which illustrates a simple embodiment of the present invention, the reference character 5 designates a fragment of the table or bed of a die press or other press mechanism in which the dies are used. Such die press usually contains a vertical spindle $5^a$ above the table, 5, and means for rotating the spindle and raising and lowering it, as is well understood, and as the press forms no part of the present invention, no detail description of the same is necessary so far as this specification is concerned.

Secured upon the table 5 and extending down into a recess or opening therein, is the female die or mold 6 of the device. Usually the female die has a flange 7 which rests on the table and is secured thereto in any suitable manner. The female die contains a cavity 8, whose wall $8^a$ is shaped to conform to the shape that is to be given the article to be formed, and in the present instance the dies have been designed to form a flower pot, A. The cavity 8 opens out through the top of the female die, but the lower end is closed by a movable bottom plunger 9 which normally rests on a shoulder 10 formed on the inner face of the wall $8^a$. A push rod 11, (operated by the press mechanism) is secured in the bottom plunger 9 and acts to raise said bottom plunger, after the article has been formed, and eject it from the female die. Usually the rod raises the bottom plunger to a place above the female die, and the attendant removes the article from it. Relief apertures 12, 13, are formed in the wall 8ᵃ of the female die, bottom plunger 9, and push rod 11, to permit any excess clay to escape. Adjacent its upper edge the inner face of the wall 8ᵃ is cut back a little to form the usual collar b on the article. At its upper side the female die may be formed with a sharp annular cutting edge 14 which defines the upper edge of the cavity in the female die.

The male die 15 has a head portion 16, conforming generally to the shape of the cavity 8 in the female die, but of less diameter, so as to leave a space between the faces of the cavity wall and head (when the head is lowered into the cavity), in which space the article is formed. On the upper end of the head 16, the male die has a stem 17 adapted to be secured to the spindle of the press. At the lower end of the head 16 is a plunger 18, the lower face of which is shaped to give the desired shape to the inner face of the bottom of the article to be formed, and the plunger has a neck 19, which is guided in a hole in the lower end of the head 16, and in said neck is secured a stem 20, which extends up through the stem 17 of the head and has a nut 21 on its upper end that may rest on the top of the stem and support the plunger when the male die is raised out of the female die. A spring 22 confined in a cavity in the head and bearing on the plunger 18 acts to depress said plunger and strip the finished article from the male die when the latter is raised after having completed the forming operation. A pin 18ᵃ secured in the plunger 18, and adapted to enter the aperture 13, furnishes means for punching the hole in the bottom of the flower pot.

Surrounding the male die is an edge trimming or cutting member 25, which is capable of being non-rotatable, at least during the final downward movement of the male die. Said edge trimming member may move up and down with the male die and may rotate therewith except when it comes into contact with the female die. As shown, the edge trimming member is revolubly mounted on the male die and moved therewith. Being revolubly mounted on the male die, its rotatory movement is arrested when it comes into contact with the female die, and consequently no abrading action takes place.

In the form of edge cutting member shown, the knife portion 26 is in the form of a collar or ring, threadedly mounted on a sleeve 27 and secured thereon by a set screw 28. The sleeve 27 is rotatively mounted on the stem 17 and is held against movement lengthwise thereof, as for instance by bearing rings 29, 30, threadedly mounted on a threaded portion of the stem 17, one on each side of an inturned flange or web 31, which is formed on the sleeve 27. Lock nuts 32 are secured on the stem 17, beyond the bearing rings 29, 30, and act to lock said rings in place. Antifriction washers and rings 33, 34 are interposed between the flange 31, bearing rings 29, 30, and stem 17, to reduce, to a minimum, the friction between the edge trimming member and stem. A cover plate 35 is secured to the top of the sleeve 27 and encloses the bearing members, and oil ducts are formed in the sleeve whereby lubricating oil may be conveyed to the bearing. A vent 37 leads out from the cavity in the male die head, as shown.

The lower edge of the knife 26 of the edge trimming member is formed with an annular groove 38 which coincides with the top of the annular space formed between the male die head and wall of the cavity 8 of the female die, and a cutting edge 39 is formed on the knife 26, which cooperates with the cutting edge 14 of the female die to trim off any material that may be squeezed out between the opposing and cutting edges.

In the operation of the device the male die is raised and lowered, and rotated by the press mechanism. While the male die is in its raised position the attendant, places a lump of clay or other suitable material in the cavity of the female die, and as the male die descends, it forces the material down upon the bottom plunger 9 and up between the male die head and wall of the cavity of the female die. Inasmuch as the male die rotates, it rotates the material with it. When the male die approaches the end of its down stroke, the knife comes into contact with the upper edge of the material, which at this time has been forced up to the top of the cavity in the female die, and the edge of the material enters the groove 38 in the knife and receives its form therein. Any excess material is squeezed out between the cutting edges 38, 14 of the knife and female die and as the knife engages the female die it ceases to rotate. The excess material which has been forced out between the cutting edges is, however, completely severed from the article formed in the dies by the pressure of the knife on the protruding material at the end of the down stroke of the male die. When the article is formed, the head is withdrawn, the plunger thereof stripping the work from the head and thereupon the lower plunger is raised, the article ejected from the female die and removed by the attendant.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. The combination with a reciprocatory and rotative male pottery forming die and its stem, and a female pottery forming die cooperating therewith in the formation of pottery ware, of an edge trimming knife having an annular cutting edge arranged to cooperate with said female die in trimming the edge portion of the article formed by the dies, and a sleeve rotatively mounted on the stem of said male die, said knife being adjustably secured on said sleeve.

2. The combination with a reciprocatory and rotative male pottery forming die and its stem, and a female pottery forming die cooperating therewith in the formation of pottery ware, of an edge trimming knife having an annular cutting edge arranged to cooperate with said female die in trimming the edge portion of the article formed by the dies, a sleeve having an internal flange, bearing rings secured to the stem of said male die, one on each side of said flange and forming a bearing for said sleeve, said knife being secured to said sleeve.

3. The combination with a reciprocatory and rotative male pottery forming die and its stem, and a female pottery forming die cooperating therewith in the formation of pottery ware, of an edge trimming knife having an annular cutting edge arranged to cooperate with said female die in trimming the edge portion of the article formed by the dies, an externally threaded sleeve rotatively mounted on the stem of said male die, said edge trimming knife being threadedly secured on said threaded sleeve.

4. The combination with a reciprocatory and rotative male pottery forming die and its stem, and a female pottery forming die cooperating therewith in the formation of pottery ware, of an edge trimming knife having an annular cutting edge arranged to cooperate with said female die in trimming the edge portion of the article formed by the dies, an externally threaded sleeve, and anti-friction bearings rotatively connecting said sleeve with the stem of said male die, said edge trimming knife being threadedly secured to said sleeve.

JOHN ANDRONOWICZ.